(12) United States Patent
Chuang et al.

(10) Patent No.: US 7,317,584 B2
(45) Date of Patent: Jan. 8, 2008

(54) ZOOM LENS

(75) Inventors: Fu-Ming Chuang, Hsinchu (TW); Kuo-Chuan Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 11/551,247

(22) Filed: Oct. 20, 2006

(65) Prior Publication Data

US 2007/0115561 A1   May 24, 2007

(30) Foreign Application Priority Data

Nov. 24, 2005   (TW) .............................. 94141249 A

(51) Int. Cl.
*B02B 9/34* (2006.01)
(52) U.S. Cl. ...................................... 359/774; 359/772
(58) Field of Classification Search ................ 359/774, 359/772, 686, 687, 771, 776

See application file for complete search history.

(56) References Cited

U.S. PATENT DOCUMENTS

| | | | |
|---|---|---|---|
| 6,259,508 B1 * | 7/2001 | Shigematsu | 355/53 |
| 6,718,132 B2 | 4/2004 | Nishina | |
| 2006/0072213 A1 * | 4/2006 | Shibayama et al. | 359/692 |

* cited by examiner

*Primary Examiner*—Timothy J. Thompson
(74) *Attorney, Agent, or Firm*—Jianq Chyun IP Office

(57) ABSTRACT

A zoom lens for imaging an image onto a photosensitive element includes a first lens group, a second lens group, a third lens group and a fourth lens group. The second lens group is located and suitable for moving between the first lens group and the third lens group; the fourth lens group is located and suitable for moving between the third lens group and the photosensitive element. The first lens group, the second lens group, the third lens group, and the fourth lens group have a positive refractive power, a negative refractive power, a positive refractive power and a positive refractive power, respectively. Besides, the third lens group includes at least a hybrid lens and the second lens group includes at least an aspheric lens, the number of the aspheric lens is smaller than or equal to 2. Thus, manufacturing cost of the zoom lens mentioned above is lower.

9 Claims, 14 Drawing Sheets

ZOOM LENS

CROSS-REFERENCE TO RELATED APPLICATION

This application claims the priority benefit of Taiwan application serial no. 94141249, filed Nov. 24, 2005. All disclosure of the Taiwan application is incorporated herein by reference.

BACKGROUND OF THE INVENTION

1. Field of Invention

The present invention relates to a zoom lens, and particularly to a low-cost zoom lens.

2. Description of the Related Art

Along with the development of modern video technology, image devices, such as digital video cameras (DVCs), digital still cameras (DSCs) and the like, have been broadly used by the public. One of kernel components in the image devices is a zoom lens, by which an image can be clearly focused on a charge coupled device (CCD) for imaging by the optical zooming of the zoom lens. Thus, the optical quality of the zoom lens is closely linked to the image quality. In the competitive market, manufacturers strive for improving the quality of the zoom lens and reducing the manufacturing cost thereof so as to advance the product competitiveness of their own.

Referring to FIGS. 1A and 1B, FIGS. 1A and 1B are schematic structure drawings of a conventional zoom lens with different zooming magnification. FIG. 1A corresponds to the mean position of the zoom lens, while FIG. 1B corresponds to the tele-end position of the zoom lens. The conventional zoom lens 100, disclosed by U.S. Pat. No. 6,718,132, includes a first lens group 110, a second lens group 120, a third lens group 130, a fourth lens group 140 and a fifth lens group 150. The five lens groups comprise three pieces of lenses 112, three pieces of lenses 122, one piece of lens 132, four pieces of lenses 142 and one piece of lens 152, respectively; that is, the zoom lens 100 is constructed by twelve pieces of lenses in total.

As described, when the magnification of the zoom lens 100 changes from the wide-end to tele-end (as shown in FIG. 1B), or from the tele-end to wide-end, the second lens group 120, the fourth lens group 140 and the fifth lens group 150 in the above-mentioned five lens groups move simultaneously for increasing or reducing the magnification. It can be seen that the mechanism of the zoom lens 100 is designed as an interlocked device so that the above-mentioned the second lens group 120, the fourth lens group 140 and the fifth lens group 150 move simultaneously. Thus, the mechanism is relatively complex, and the overall size of the zoom lens can not be reduced, causing the production cost to be increased.

SUMMARY OF THE INVENTION

The present invention is directed to provide a zoom lens to reduce the production cost and remain the good imaging quality of high magnification and high resolution.

As embodied and broadly described herein, the present invention provides a zoom lens, suitable for imaging an image on a photosensitive element. The zoom lens includes a first lens group, a second lens group, a third lens group and a fourth lens group. The first lens group has a positive refractive power, and the second lens group has a negative refractive power and is located between the first lens group and the photosensitive element. The second lens group includes at least an aspheric lens and the number thereof is smaller than or equal to 2. The third lens group has a positive refractive power and is located between the second lens group and the photosensitive element. The third lens group includes at least a hybrid lens and the second lens group is suitable for moving between the first lens group and the third lens group. The fourth lens group having a positive refractive power is located between the third lens group and the photosensitive element, and is suitable for moving between the third lens group and the photosensitive element.

In summary, the zoom lens of the present invention only needs to move the second lens group and the fourth lens group to obtain a zooming function, which merely requires the above-mentioned two lens groups to be jointly moved. Therefore, such interlocked mechanism is simpler with lower cost. In addition, in comparison with the prior art where a zoom lens comprises twelve pieces of lenses, the zoom lens of the present invention comprises eleven pieces of lenses leading to a lower production cost. Furthermore, the four lens groups are the combination of a positive refractive power, a negative refractive power, a positive refractive power and a positive refractive power to eliminate the aberration thereof. Moreover, incorporating the hybrid lenses enables the zoom lens of the present invention to have good imaging quality of high magnification and high resolution.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

The First Embodiment

Figure 2A:
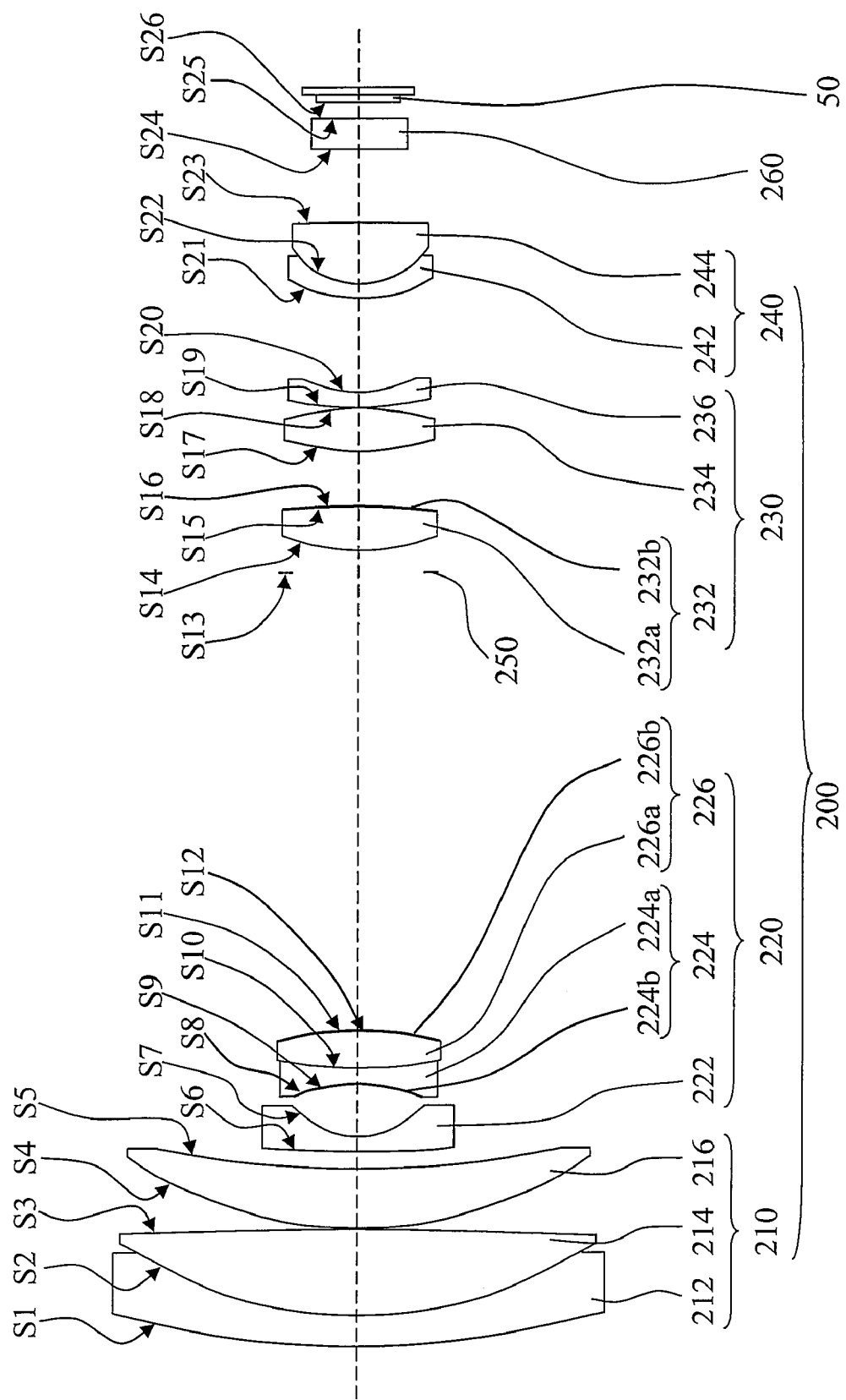
FIGS. 2A~2C are schematic structure drawings of a zoom lens provided by a first embodiment of the present invention with different zooming magnification.
Figure 2B:
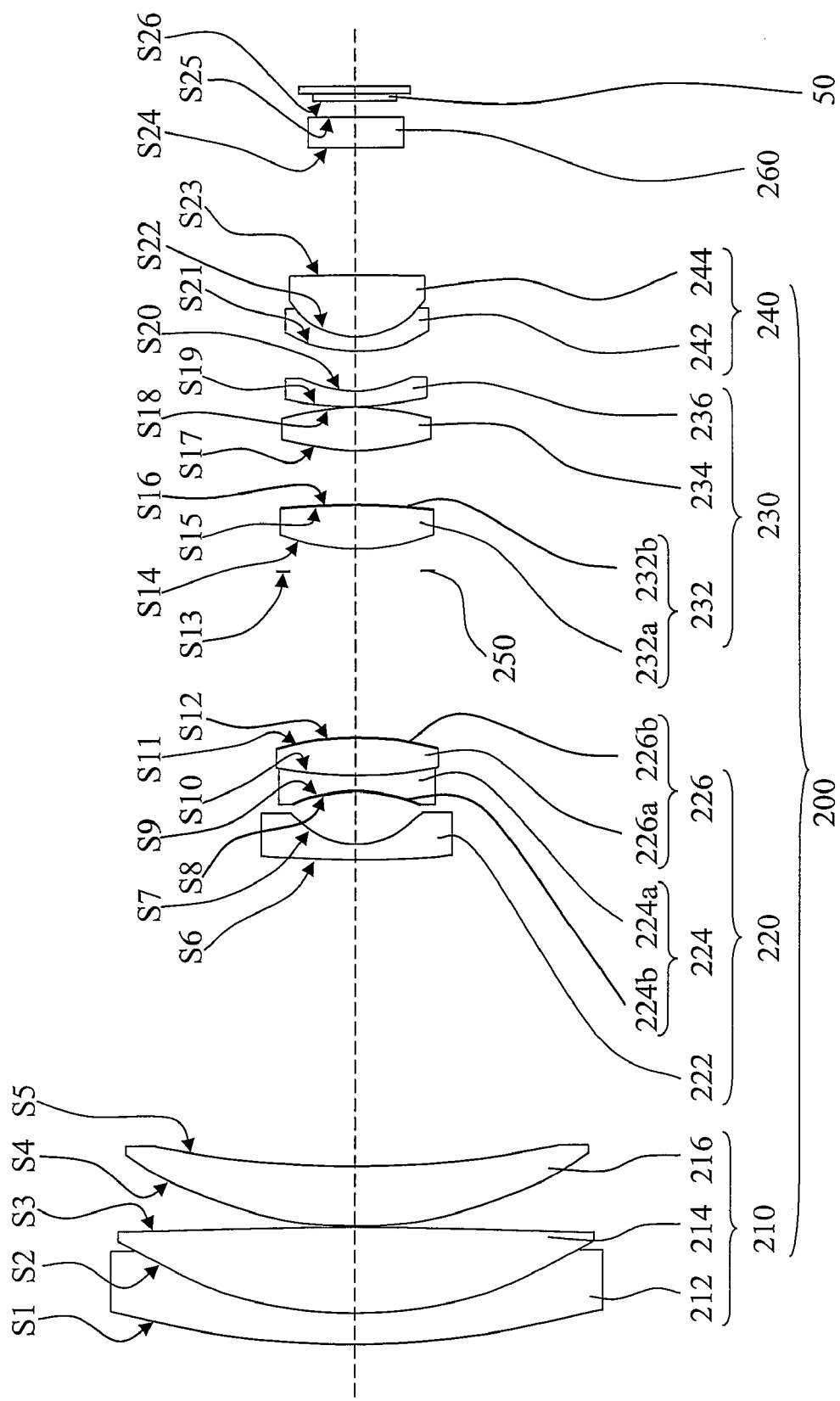
Figure 2C:
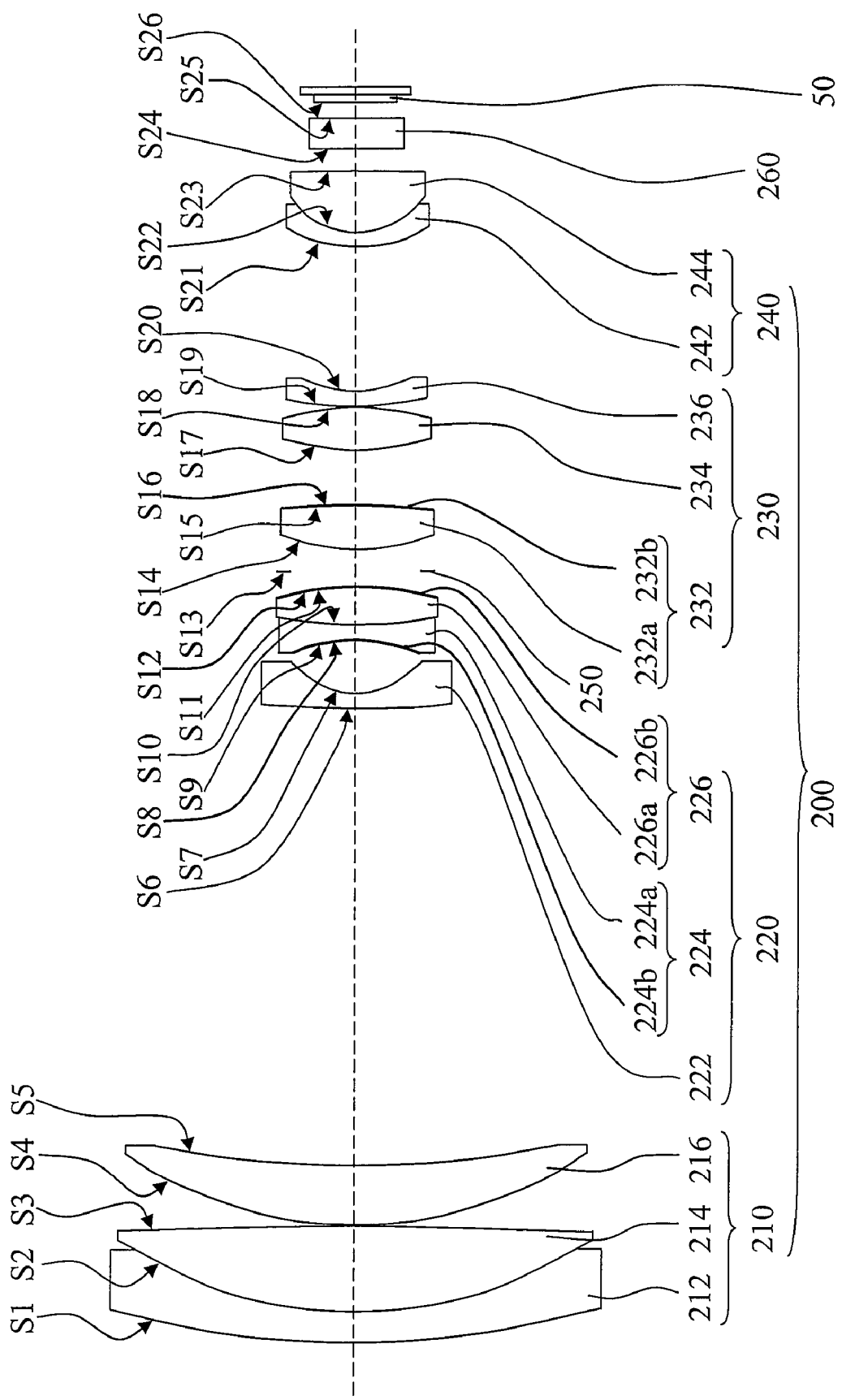

FIGS. 2A~2C are schematic structure drawings of a zoom lens provided by a first embodiment of the present invention with different zooming magnification. FIG. 2A represents the zoom lens structure at the wide-end, FIG. 2B represents the zoom lens structure at the middle position and FIG. 2C represents the zoom lens structure at the tele-end. Referring to FIGS. 2A~2C, a zoom lens 200 of the present invention is suitable for imaging an image (not shown) on a photosensitivity element 50, the photosensitivity element 50 is, for example, a charge coupled device (CCD) or a complementary metal-oxide semiconductor (CMOS). The zoom lens 200 includes a first lens group 210, a second lens group 220, a third lens group 230 and a fourth lens group 240. The second lens group 220 is located between the first lens group 210 and the third lens group 230 and is suitable for moving between the first lens group 210 and the third lens group 230. The fourth lens group 240 is located between the third lens group 230 and the photosensitivity element 50 and is suitable for moving between the third lens group 230 and the photosensitivity element 50.

The first lens group 210, the second lens group 220, the third lens group 230 and the fourth lens group 240 have a positive refractive power, a negative refractive power, a positive refractive power and a positive refractive power, respectively, and in this way the zoom lens 200 effectively eliminates the aberration thereof through the refractive power combination. Besides, the third lens group 230 includes at least a hybrid lens, and the second lens group 220 includes at least an aspheric lens and the number of the aspheric lens is smaller than or equal to 2. The hybrid lens includes a lens and a resin layer adhered onto the lens.

Figure 1A:
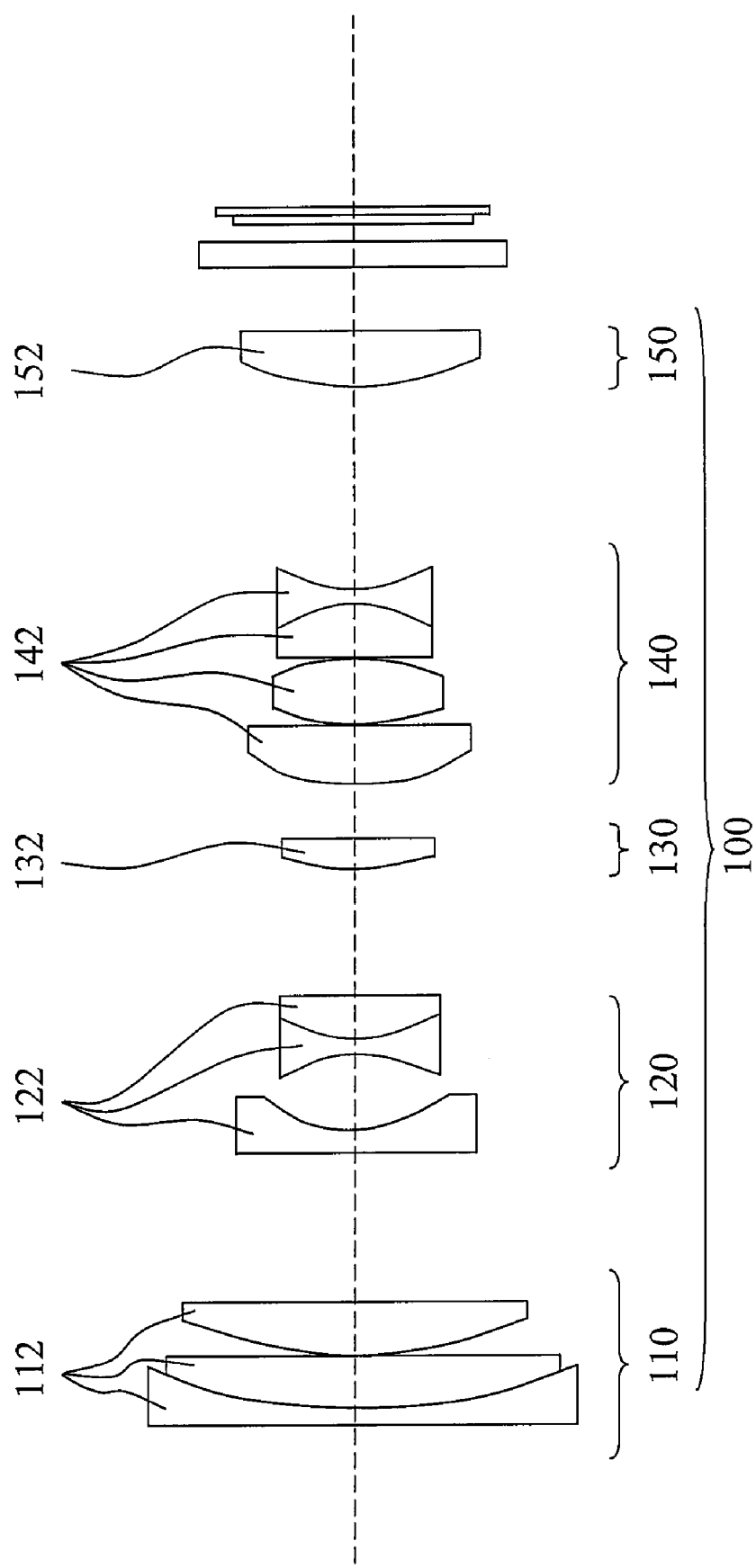
FIGS. 1A and 1B are schematic structure drawings of a conventional zoom lens with different zooming magnification.
Figure 1B:
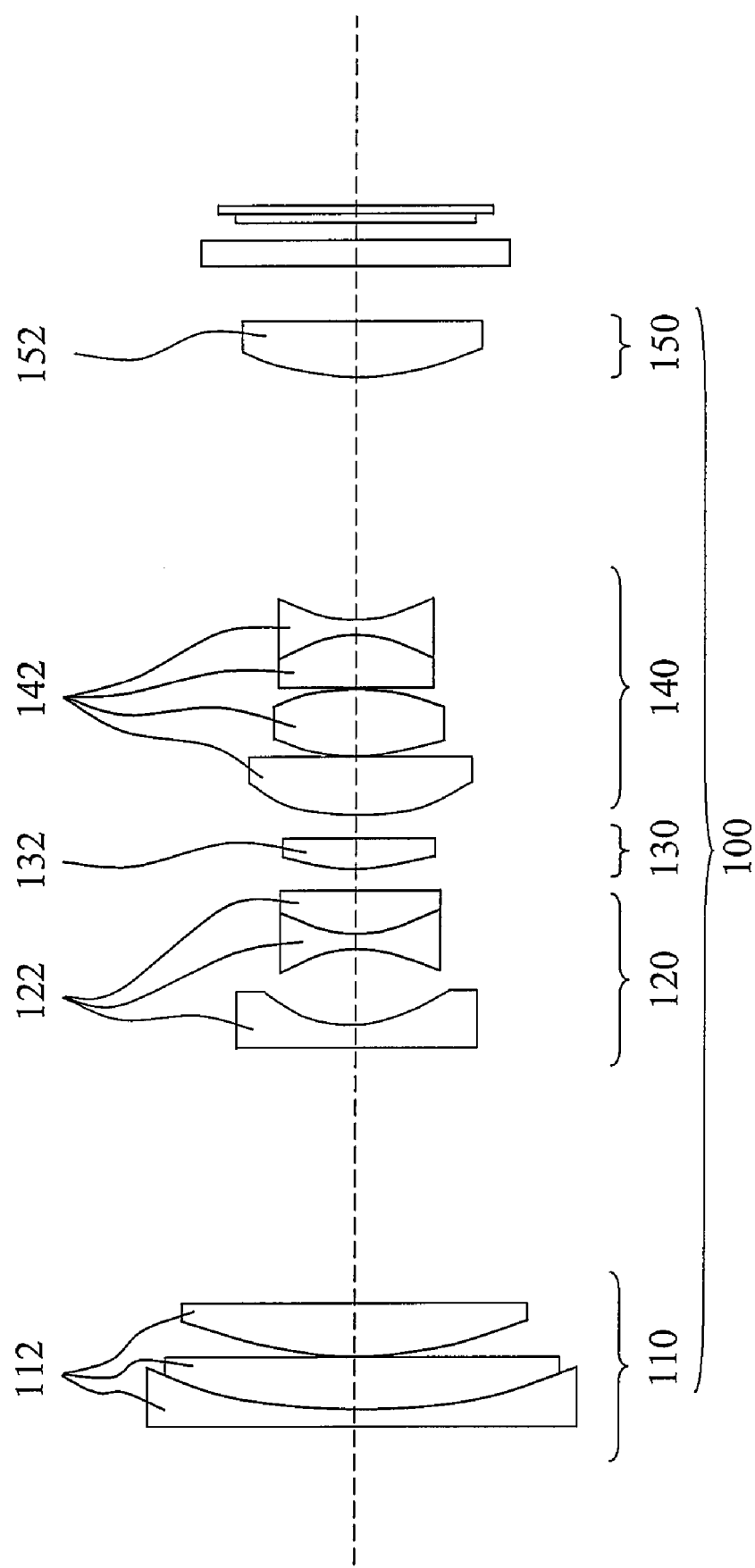

Still referring to FIGS. 2A~2C, the first lens group 210 includes a first lens 212, a second lens 214 and a third lens 216 arranged in sequence, and the third lens 216 is adjacent to the second lens group 220. The second lens group 220 includes a fourth lens 222, a first aspheric hybrid lens 224 and a second aspheric hybrid lens 226 arranged in sequence. The second aspheric hybrid lens 226 is adjacent to the third lens group 230. The third lens group 230 includes a third aspheric hybrid lens 232, a eighth lens 234 and a ninth lens 236 arranged in sequence, and the ninth lens 236 is adjacent to the fourth lens group 240. The fourth lens group 240 includes a tenth lens 242 and an eleventh lens 244 arranged in sequence. The eleventh lens 244 is adjacent to the photosensitivity element 50. In addition, the first lens 212, the second lens 214, the third lens 216, the fourth lens 222, the first aspheric hybrid lens 224, the second aspheric hybrid lens 226, the third aspheric hybrid lens 232, the eighth lens 234, the ninth lens 236, the tenth lens 242 and the eleventh lens 244 have a negative refractive power, a positive refractive power, a positive refractive power, a negative refractive power, a negative refractive power, a positive refractive power, a positive refractive power, a positive refractive power, a negative refractive power, a negative refractive power and a positive refractive power, respectively. In comparison with the conventional zoom lens 100 (as shown in FIG. 1A), which comprises twelve pieces of lenses, the zoom lens 200 according to the embodiment of the present invention comprises only eleven pieces of lenses, leading to a lower production cost.

The first aspheric hybrid lens 224 is formed by, for example, a fifth lens 224a and a first resin layer 224b, and the first resin layer 224b is disposed on the surface of the fifth lens 224a and located between the fourth lens 222 and the fifth lens 224a. The second aspheric hybrid lens 226 is formed by, for example, a sixth lens 226a and a second resin layer 226b, and the second resin layer 226b is disposed on the surface of the sixth lens 226a and located between the sixth lens 226a and the third lens group 230. The third aspheric hybrid lens 232 is formed by, for example, a seventh lens 232a and a third resin layer 232b. The third resin layer 232b is disposed on the surface of the seventh lens 232a and located between the seventh lens 232a and the eighth lens 234.

Generally speaking, a zoom lens is usually designed to have a combination structure of spherical lenses and aspheric lenses for a better optical quality and effect. However, an aspheric lens is more costly than a spherical lens, which leads to a higher production cost of a zoom lens having aspheric lenses. According to the prior art, there are two processes for fabricating an aspheric lens. For example, a first process is that an injection molding process is used for directly forming a required aspheric lens. However, the surface of an aspheric lens has areas with different curvatures. Therefore, a mold sticking problem between the lens and the mold is likely to occur and the lifetime of the mold is consequently shortened. A second process is to provide a parent material (for example, a plastic plate or a glass plate) first, followed by lapping the parent material to complete an aspheric lens. Since a plurality of areas with different curvatures is to be made by a lapping tool, the process needs a lapping tool with complicated design and accordingly causes a higher cost. In short, the above-described two processes for fabricating an aspheric lens require higher production cost.

The process to make the aspheric lenses 224, 226 and 232 of the present invention is to perform lapping on the above-mentioned parent material for completing a spherical lens first, followed by adhering a resin layer onto the spherical lens for completing an aspheric hybrid lens. The fifth lens 224a, the sixth lens 226a and the seventh lens 232a according to the embodiment of the present invention are spherical lenses, which are easier to make by using a lapping process and are cheaper. In addition, the cost of the resin layer is also low. Accordingly, compared with the prior art, the adopted process in the present invention, i.e. adhering a resin layer onto a spherical lens to form an aspheric hybrid lens, has lower production cost and still remains the required optical characteristics of an aspheric lens. Thus, the zoom lens of the present invention is able to effectively reduce cost and remain the good imaging quality with high magnification and high resolution.

Referring to FIGS. 2A~2C again, when the zoom lens 200 changes the magnification thereof from the wide-end (as shown in FIG. 2A) to the middle position (as shown in FIG. 2B), both the second lens group 220 and the fourth lens group 240 move towards the third lens group 230. When the zoom lens 200 further changes the magnification thereof from the middle position to the tele-end (as shown in FIG. 2C), the second lens group 220 continues to move towards the third lens group 230, while the fourth lens group 240 inverted moves towards the photosensitivity element 50. In other words, the zoom lens 200 of the present invention only moves the second lens group 220 and the fourth lens group 240 for the zooming purpose, therefore, the mechanism is designed to have the above-described lens groups moved jointly, thus the mechanism is simpler and the cost is lower.

Note that when the zoom lens 200 changes the magnification thereof from the wide-end to the tele-end, the second lens group 220 has a moving distance D in total (not shown) and the zoom lens 200 has an effective focal length EFL (not shown) corresponding to the wide-end. In the embodiment, to achieve a better quality of the zoom lens 200, the preferred ratio of EFL/D is, for example, smaller than or equal to 0.132. If the ratio of EFL/D is larger than 0.132, the displacement of the second lens group 220 exceeds the normal required amount, which increases the overall size of the zoom lens 200 for achieving the same imaging quality, therefore the downsized design requirement can not be met.

In addition, in the zoom lens 200 of the present invention, the imaging position is further adjusted for optical focusing in clarity by means of moving the fourth lens group 240 apart from or close to the photosensitivity element 50. In other words, the fourth lens group 240 functions is not only a zooming device, but also a compensation for images, which can avoid problems of aberration and imaging plane shift.

Referring to FIGS. 2A~2C again, to get a further better optical quality of the zoom lens 200, the zoom lens 200 further includes an aperture stop (STO) 250 and a low pass filter 260. In the following, the preferred data of the lenses in the zoom lens 200 are listed below.

TABLE 1

| Surface | Curvature Radius (mm) | Interval (mm) | Refractive index | Abbe number | Remark |
|---|---|---|---|---|---|
| S1 | 72.90000 | 2.000000 | 1.8467 | 23.78 | the first lens |
| S2 | 31.48000 | 5.670000 | 1.6180 | 63.33 | the second lens |
| S3 | −553.530 | 0.100000 | | | |
| S4 | 29.88000 | 4.090000 | 1.8040 | 46.57 | the third lens |
| S5 | 81.64000 | changeable distance | | | |
| S6 | 69.81000 | 1.000000 | 1.8040 | 46.57 | the fourth lens |
| S7 | 6.00000 | 3.430000 | | | |
| S8 | −13.93556 | 0.100048 | 1.5158 | 52.63 | the first resin layer layer |
| S9 | −12.42000 | 1.000000 | 1.6204 | 60.29 | the fifth lens |
| S10 | 28.5000 | 2.520000 | 1.8467 | 23.78 | the sixth lens |
| S11 | −25.3200 | 0.050000 | 1.5158 | 52.63 | the second resin layer |
| S12 | −40.60242 | changeable distance | | | |
| S13 | Infinity | 1.500000 | | | |
| S14 | 17.49000 | 2.820000 | 1.6400 | 60.08 | the seventh lens |
| S15 | −127.000 | 0.200000 | 1.5158 | 52.63 | the third resin layer |
| S16 | −95.16479 | 3.620000 | | | |
| S17 | 18.54000 | 2.800000 | 1.4875 | 70.24 | the eighth lens |
| S18 | −19.61000 | 0.100004 | | | |
| S19 | 30.72000 | 1.000000 | 1.8467 | 23.78 | the ninth lens |
| S20 | 10.19000 | changeable distance | | | |
| S21 | 10.43000 | 1.000000 | 1.8010 | 34.97 | the tenth lens |
| S22 | 5.94000 | 4.000000 | 1.6510 | 56.16 | the eleventh lens |
| S23 | −255.2900 | changeable distance | | | |
| S24 | Infinity | 2.000000 | 1.5160 | 64.24 | the low pass filter |
| S25 | Infinity | 1.150000 | | | |
| S26 | Infinity | 0.000000 | | | |

In Table 1, the curvature radius (mm) means the curvature radius of every surface and the interval (mm) means the distance between two adjacent surfaces. For example, the interval of the surface S1 indicates the distance between the surface S1 and the surface S2. In the "remark" column, the listed lenses, resin layers and low pass filters mean they have the same thickness, refractive indexes and Abbe numbers as the listed ones on the same row. The surface S1 is the surface of the first lens 212 opposite to the second lens 214. The surface S2 is the surface joining the first lens 212 and the second lens 214. The surface S3 is the surface of the second lens 214 opposite to the first lens 212. The surfaces S4 and S5 are the surfaces of the third lens 216. The surfaces S6 and S7 are the surfaces of the fourth lens 222. The surface S8 indicates the first resin layer 224b. The surface S9 is the surface of the fifth lens 224a opposite to the sixth lens 226a. The surface S10 is the surface joining the fifth lens 224a and the sixth lens 226a. The surface S11 is the surface of the sixth lens 226a opposite to the fifth lens 224a. The surface S12 indicates the second resin layer 226b. The S13 is a virtual surface as the STO 250 used for controlling the incident light flux amount. The surfaces S14 and S15 are the surfaces of the seventh lens 232a. The surface S16 indicates the third resin layer 232b. The surfaces S17 and S18 are the surfaces of the eighth lens 234. The surfaces S19 and S20 are the surfaces of the ninth lens 236. The surface S21 is the surface of the tenth lens 242 opposite to the eleventh lens 244. The surface S22 is the surface joining the tenth lens 242 and the eleventh lens 244. The surface S23 is the surface of the eleventh lens 244 opposite to the tenth lens 242. The surfaces S24 and S25 are the surfaces of the low pass filter 260. The surface S26 is the incident surface of the photo-sensitivity element 50. The data of the surface curvature radiuses, the intervals and so on are referred to Table 1.

TABLE 2

| | | Wide-end | Middle position | Tele-end |
|---|---|---|---|---|
| Effective focal length (EFL) (mm) | | 4.1 | 18 | 82 |
| Field of viewing (FOV) (angular degree) | | 60 | 15 | 3 |
| F number (F/#) | | 1.6 | 1.8 | 2.3 |
| changeable distance (mm) | S5 | 1.043 | 20.28 | 32.22 |
| | S12 | 32.18 | 10.8 | 1 |
| | S20 | 6.2 | 2.7 | 9.9 |
| | S23 | 4.8 | 8.28 | 1.15 |

In Table 2, some important data of the zoom lens 200 corresponding to the wide-end, the middle position and the tele-end are given, which include the effective focal length (EFL), the field of view (FOV), F number (F#) and the changeable distance of the surfaces S5, S12, S20 and S23.

Figure 3A:
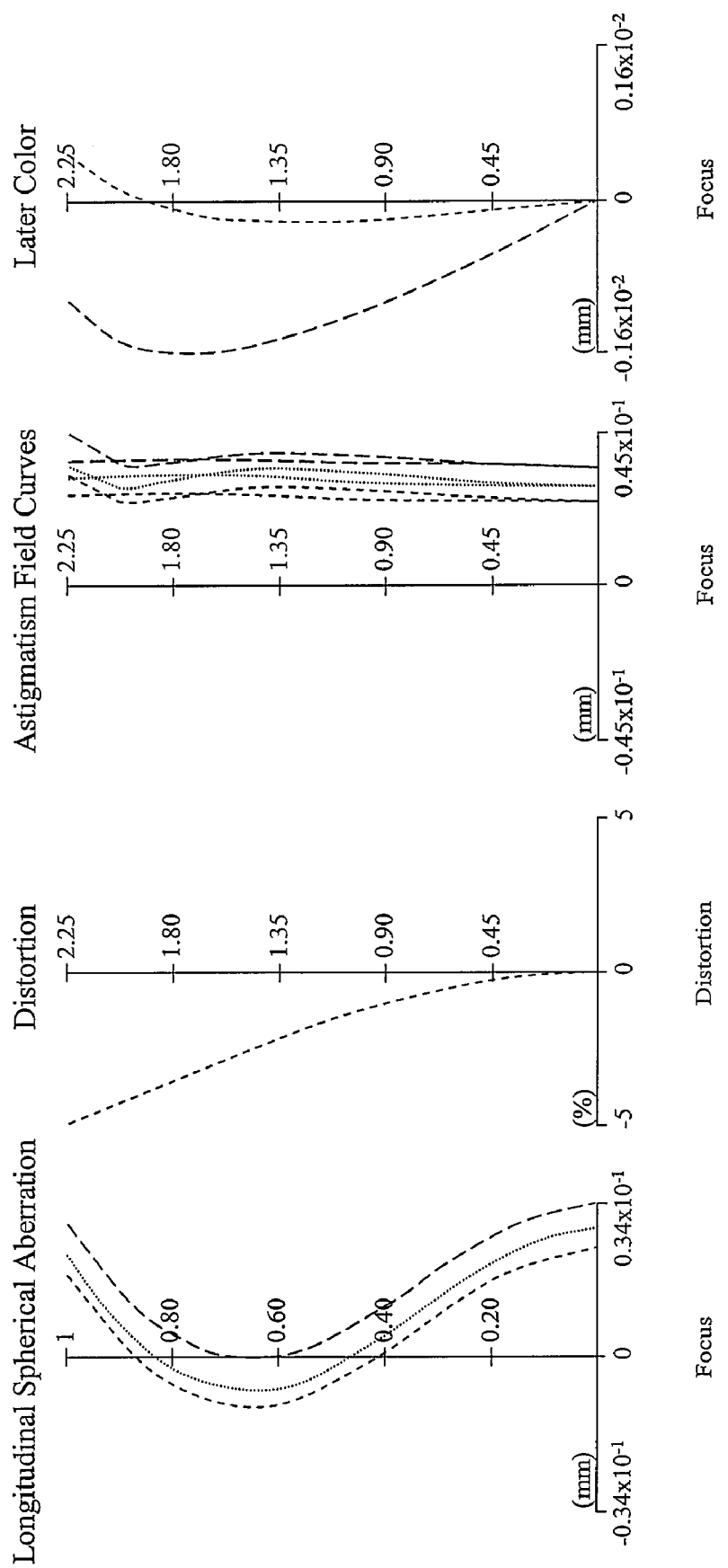
FIGS. 3A~3C are diagrams showing the longitudinal spherical aberration, distortion, astigmatism field curves, and later color corresponding to FIGS. 2A~2C, respectively.
Figure 3B:
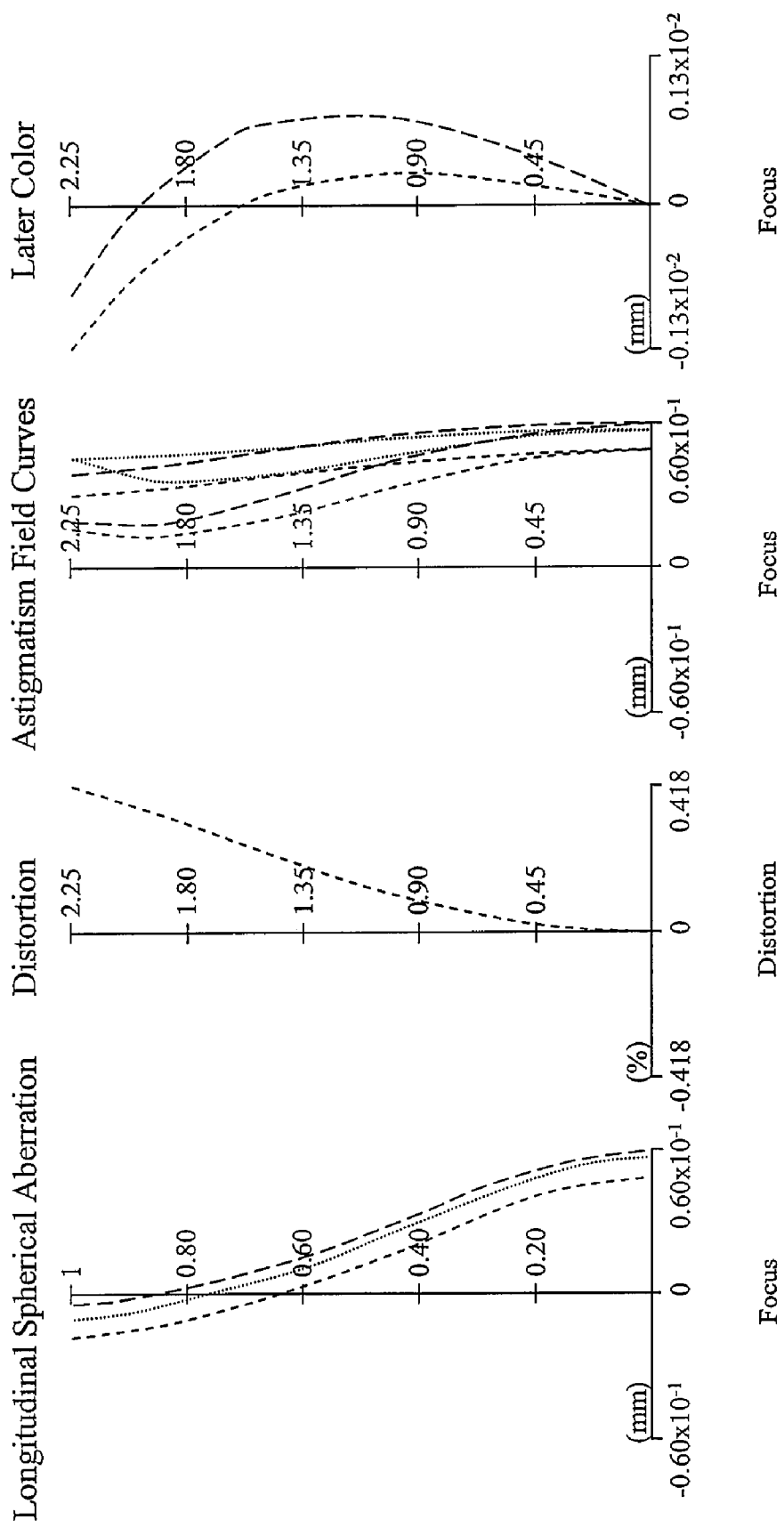
Figure 3C:
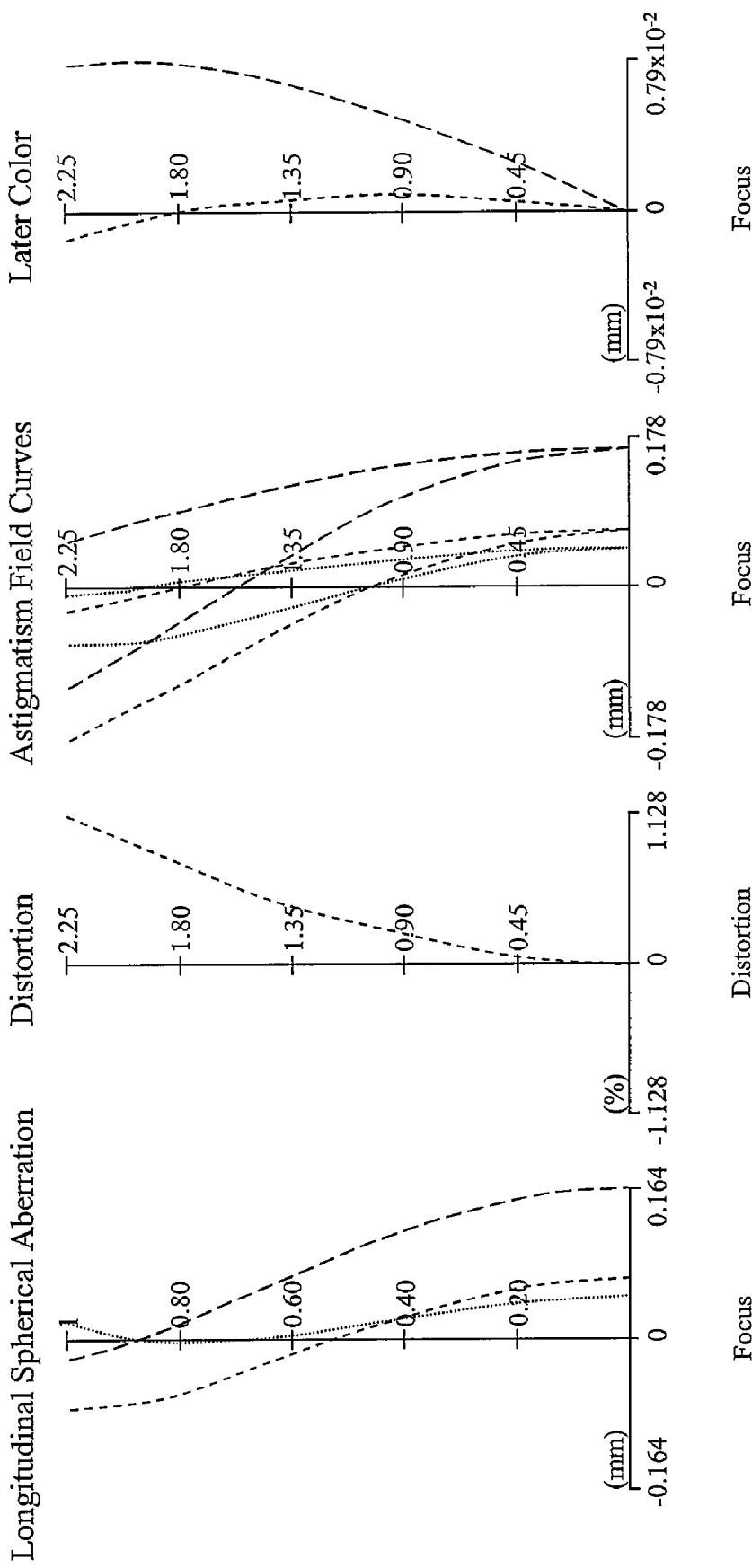

FIGS. 3A~3C are diagrams showing the optic imaging characteristic data corresponding to FIGS. 2A~2C, respectively. Referring to FIGS. 3A~3C, it can be seen the longitudinal spherical aberration, the distortion, the astigmatism field curve or the later color are within the ranges of the standard, therefore, the zoom lens 200 of the present invention has a good optical quality.

The Second Embodiment

Figure 4A:
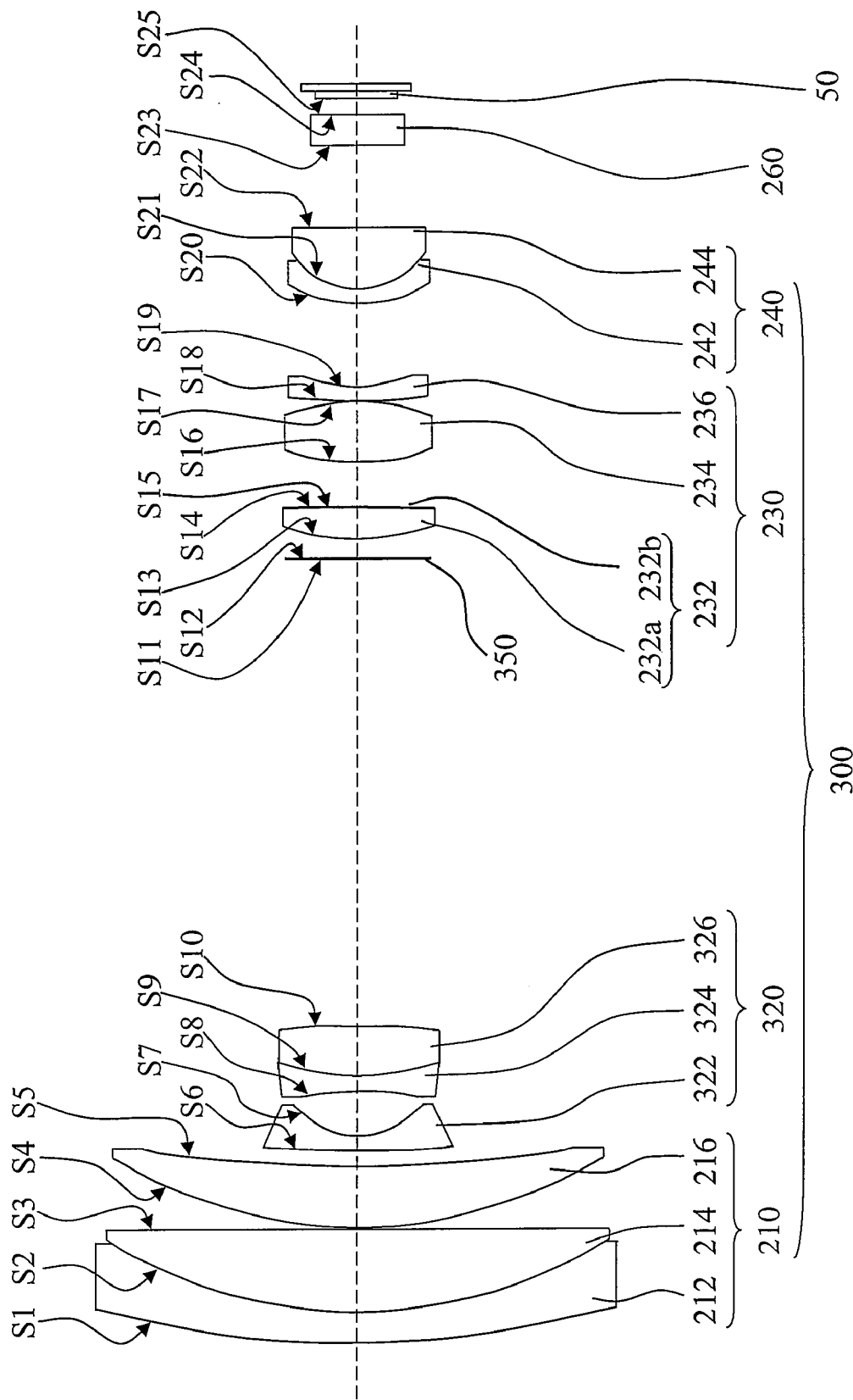
FIGS. 4A and 4C are schematic structure drawings of a zoom lens provided by a second embodiment of the present invention with different zooming magnification.
Figure 4B:
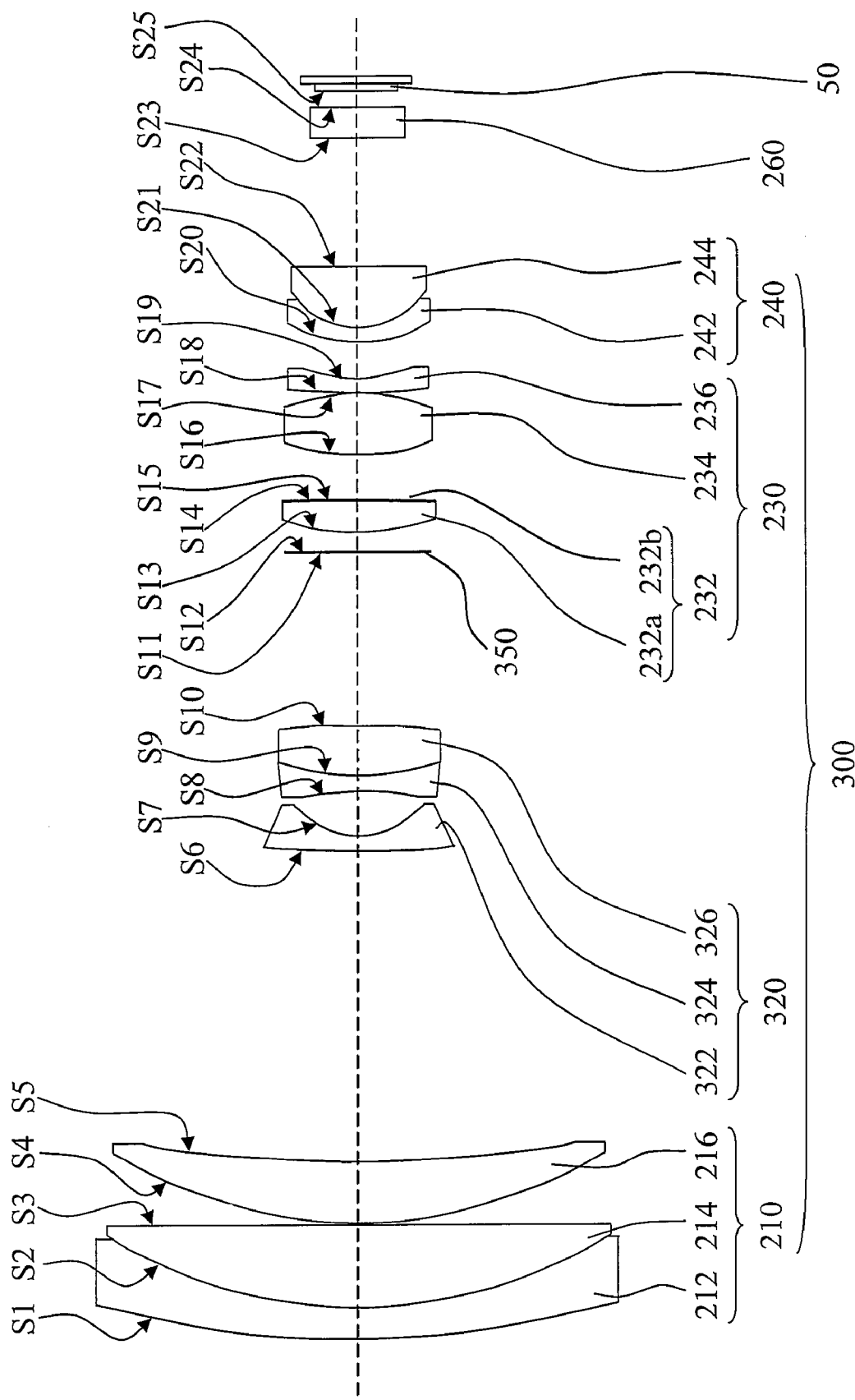
Figure 4C:
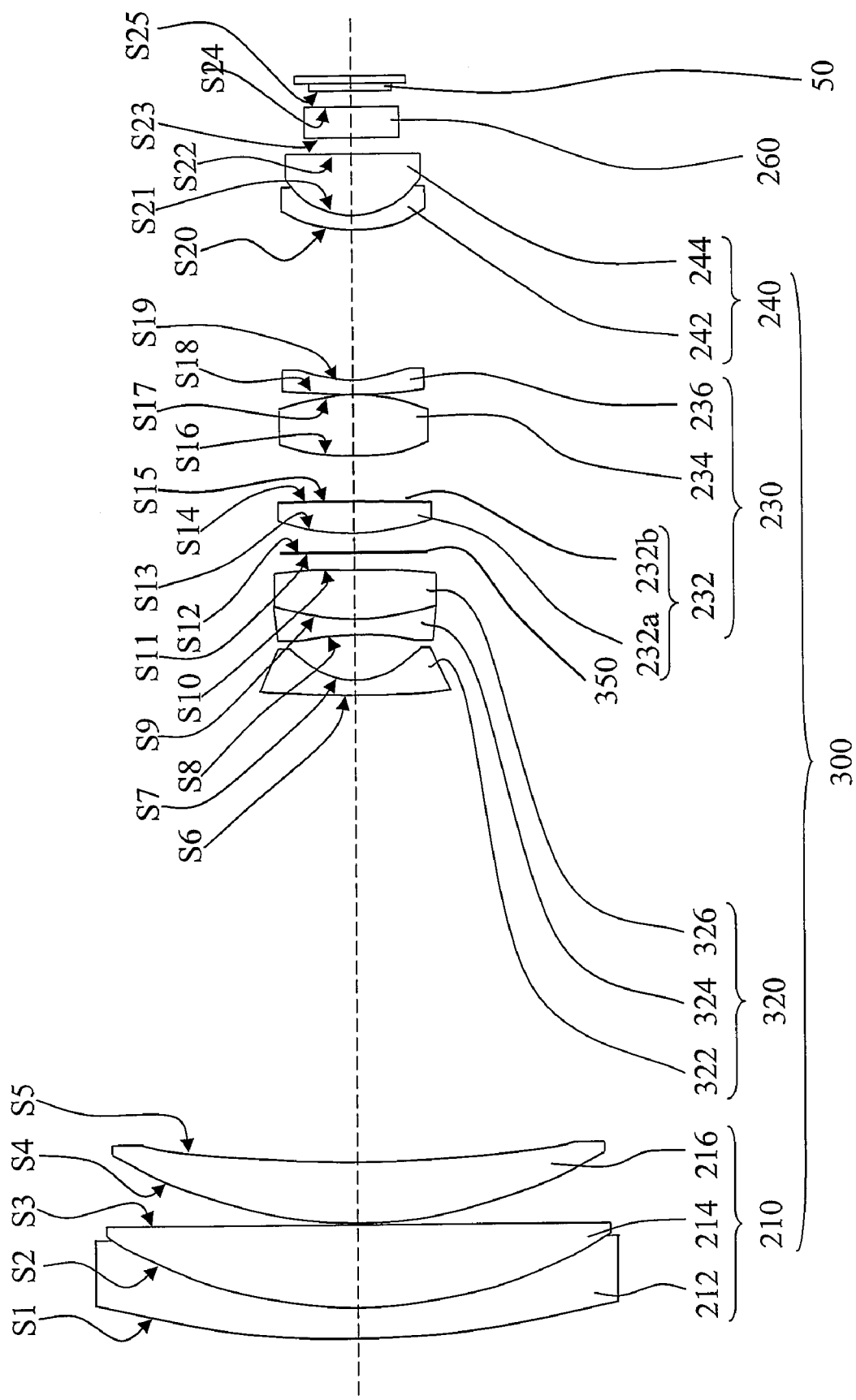

FIGS. 4A and 4C are schematic structure drawings of a zoom lens provided by a second embodiment of the present invention with different zooming magnifications. FIG. 4A, FIG. 4B and FIG. 4C show the structures of a zoom lens corresponding to the wide-end, the middle position and the tele-end, respectively. Referring to FIGS. 4A~4C, the zoom lens 300 of the present embodiment is similar to the zoom lens 200 of the first embodiment (as shown in FIG. 2A), except for the composition of the second lens group 320 in the zoom lens 300. In the embodiment, the second lens group 320 includes a fourth lens 322, a fifth lens 324 and a sixth lens 326 arranged in sequence, the sixth lens 326 is adjacent to the third lens group 230. In addition, the fourth lens 322, the fifth lens 324 and the sixth lens 326 have a negative refractive power, a negative refractive power and a positive refractive power, respectively. Furthermore, the fifth lens 324 is a spherical lens, while the sixth lens 326 is an aspheric surface mold lens. Remarkably, the zoom lens 300 further includes an infrared ray cut filter (IR cut filter) 350 to further advance the optical quality. In the following, the preferred data of the lenses in the zoom lens 300 are exemplarily listed below.

TABLE 3

| Surface | Curvature Radius (mm) | Interval (mm) | Refractive index | Abbe number | Remark |
|---|---|---|---|---|---|
| S1 | 68.32000 | 2.000000 | 1.8467 | 23.78 | the first lens |
| S2 | 30.69000 | 5.560000 | 1.6180 | 63.33 | the second lens |
| S3 | Infinity | 0.100000 | | | |
| S4 | 30.70000 | 4.060000 | 1.8040 | 46.57 | the third lens |
| S5 | 88.94000 | changeable distance | | | |
| S6 | 108.20000 | 1.000000 | 1.8040 | 46.57 | the fourth lens |
| S7 | 6.04000 | 2.920000 | | | |
| S8 | −26.10000 | 1.000000 | 1.6204 | 60.209 | the fifth lens |
| S9 | 14.58000 | 3.400000 | 1.8335 | 24 | the sixth lens |
| S10 | −109.36946 | changeable distance | | | |
| S11 | Infinity | 0.188800 | 1.4875 | 70.24 | the IR cut filter |
| S12 | Infinity | 1.311200 | | | |
| S13 | 18.91000 | 2.000000 | 1.6400 | 60.08 | the seventh lens |
| S14 | 116.58000 | 0.100000 | 1.5158 | 52.63 | the third resin layer |
| S15 | −383.70046 | 3.000000 | | | |
| S16 | 17.39000 | 3.960000 | 1.4875 | 70.24 | the eighth lens |
| S17 | −17.39000 | 0.100000 | | | |
| S18 | 25.40000 | 1.000000 | 1.8467 | 23.78 | the ninth lens |
| S19 | 10.03000 | changeable distance | | | |
| S20 | 10.41000 | 1.000000 | 1.8010 | 34.97 | the tenth lens |
| S21 | 5.88000 | 4.000000 | 1.6510 | 56.16 | the eleventh lens |
| S22 | Infinity | changeable distance | | | |
| S23 | Infinity | 2.000000 | 1.5160 | 64.24 | the low pass filter |
| S24 | Infinity | 1.000000 | | | |
| S25 | Infinity | 0.000000 | | | |

In Table 3, the surface S1 is the surface of the first lens 212 opposite to the second lens 214. The surface S2 is the surface joining the first lens 212 and the second lens 214. The surface S3 is the surface of the second lens 214 opposite to the first lens 212. The surfaces S4 and S5 are the surfaces of the third lens 216. The surfaces S6 and S7 are the surfaces of the fourth lens 322. The surface S8 is the surface of the fifth lens 324 opposite to the sixth lens 326. The surface S9 is the surface joining the fifth lens 324 and the sixth lens 326. The surface S10 is the surface of the sixth lens 326 opposite to the fifth lens 324. The surfaces S11 and S12 are the surfaces of the infrared ray cut filter (IR cut filter) 350, the surface S12 is also served as the aperture stop for controlling the incident light flux amount. The surfaces S13 and S14 are the surfaces of the seventh lens 232a. The surface S15 indicates the third resin layer 232b. The surfaces S16 and S17 are the surfaces of the eighth lens 234. The surfaces S18 and S19 are the surfaces of the ninth lens 236. The surface S20 is the surface of the tenth lens 242 opposite to the eleventh lens 244. The surface S21 is the surface joining the tenth lens 242 and the eleventh lens 244. The surface S22 is the surface of the eleventh lens 244 opposite to the tenth lens 242. The surfaces S23 and S24 are the surfaces of the low pass filter 260. The surface S25 is the incident surface of the photosensitivity element 50. The data of the surface curvature radiuses, the intervals and so on can be referred to Table 3.

TABLE 4

| | | Wide-end | Middle position | Tele-end |
|---|---|---|---|---|
| Effective focal length (EFL) (mm) | | 4 | 18 | 80 |
| Field of viewing (FOV) (angular degree) | | 62 | 15 | 2.8 |

TABLE 4-continued

| | | Wide-end | Middle position | Tele-end |
|---|---|---|---|---|
| F number (F/#) | | 1.6 | 1.9 | 2.4 |
| changeable | S5 | 1.1 | 20.7 | 32 |
| distance | S10 | 32 | 10.8 | 1.05 |
| (mm) | S19 | 5.5 | 2.3 | 9.8 |
| | S22 | 5.4 | 3.2 | 1.16 |

In Table 4, some important data of the zoom lens 300 corresponding to the wide-end, the middle position and the tele-end are given, which include the effective focal length (EFL), the field of view (FOV), F number (F#) and the changeable distance of the surfaces S5, S10, S19 and S22.

Figure 5A:
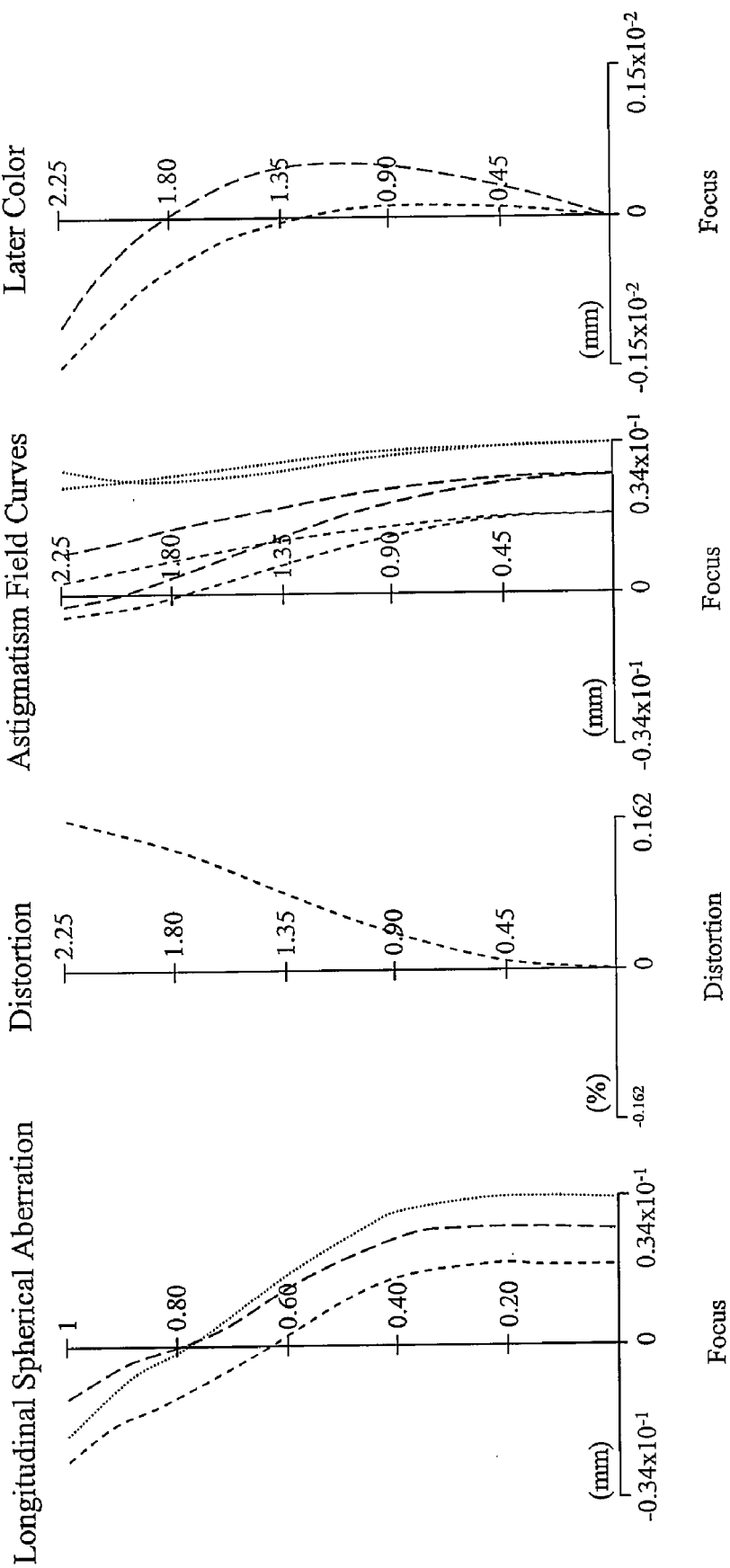
FIGS. 5A~5C are diagrams showing the longitudinal spherical aberration, distortion, astigmatism field curves, and later color corresponding to FIGS. 4A~4C, respectively.
Figure 5B:
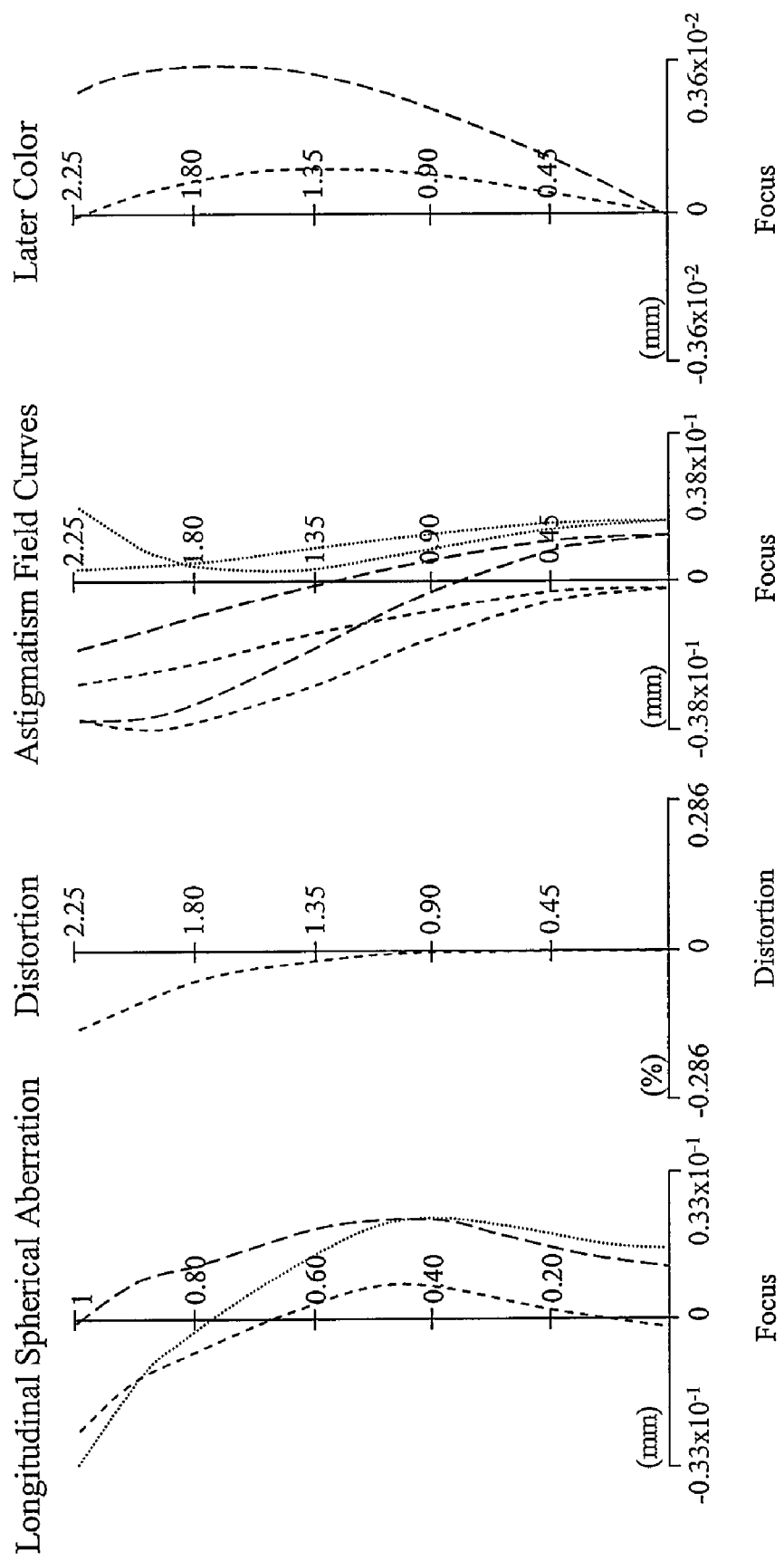
Figure 5C:
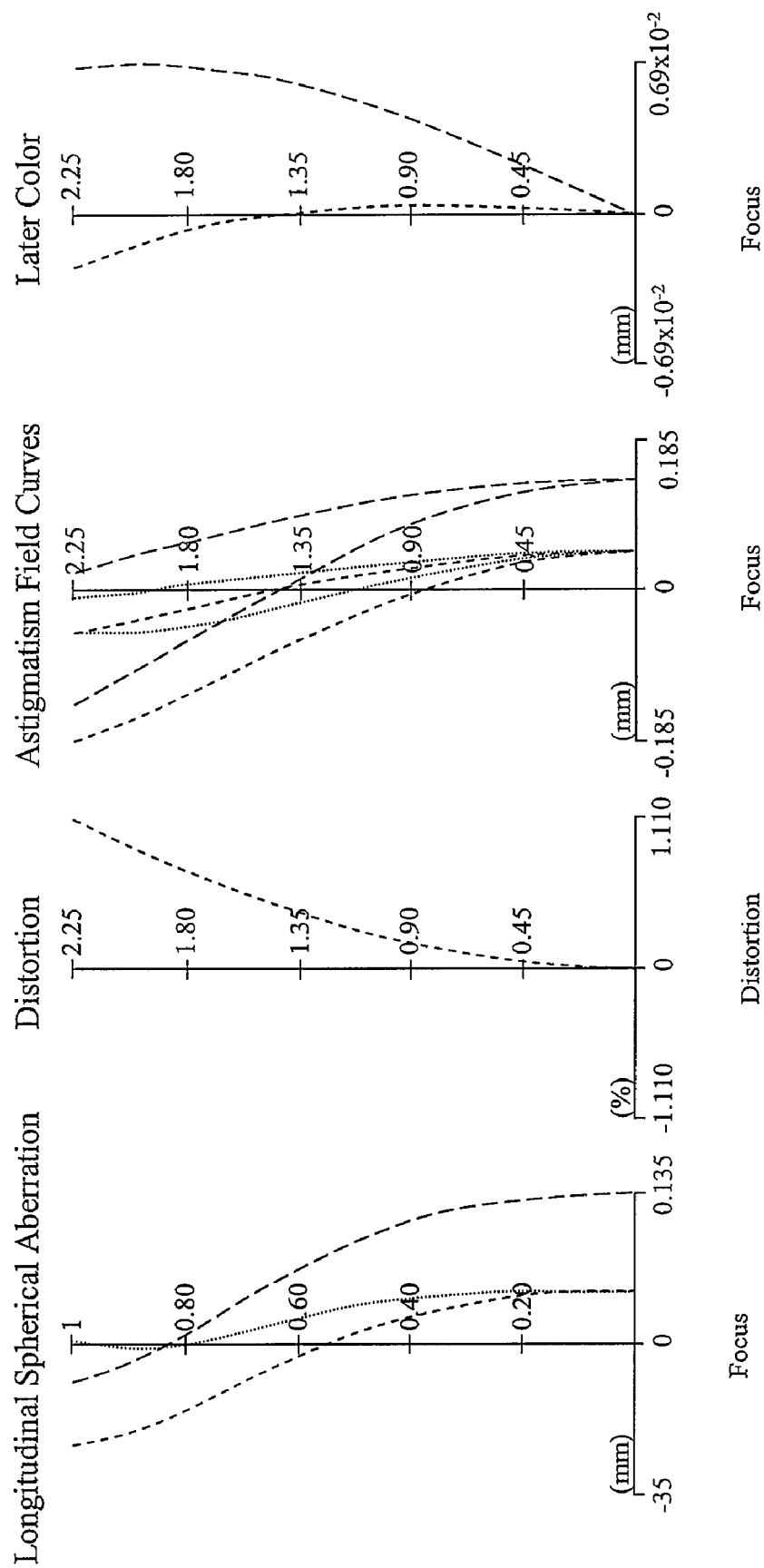

FIGS. 5A~5C are diagrams showing the optic imaging characteristic data corresponding to FIGS. 4A~4C, respectively. Referring to FIGS. 5A~5C, it can be seen that the longitudinal spherical aberration, the distortion, the astigmatism field curve or the later color are within the ranges of the standard, therefore, the zoom lens 300 of the present invention has a good optical quality.

Note that the given data in Tables 1~4 of the above-described two embodiments are not intended to limit the present invention. Anyone skilled in the art should be capable of making appropriate modifications of the parameters or the setting, which is still without departing from the scope or spirit of the invention. Furthermore, based on the well-known optical reversibility principle, anyone skilled in the art can further appropriately modify the above-described parameters to apply the zoom lens of the present invention to a projection system, which is still without departing from the scope or spirit of the invention.

In summary, the zoom lens of the present invention has at least the following advantages:

1. The zoom lens only requires moving the second lens group and the fourth lens group when zooming, thus the mechanism is designed to have the above-mentioned two lens groups moved jointly. Accordingly, the mechanism is simpler and cheaper.
2. In comparison with a conventional zoom lens which comprises twelve pieces of lenses, the zoom lens of the present invention comprises eleven pieces of lenses only, which leads to a lower production cost.
3, The four lens groups have a positive refractive power, a negative refractive power, a positive refractive power and a positive refractive power, respectively. Such refractive power combination plus the aspheric hybrid lenses enables the zoom lens of the present invention to have good imaging quality of high magnification and high resolution.
4. The fourth lens group has not only function as a zooming device, but also as a compensation for imaging, which is able to avoid the aberration and imaging plane shift problems.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A zoom lens, suitable for imaging an image onto a photosensitivity element; the zoom lens comprising:
    a first lens group, having a positive refractive power;
    a second lens group, having a negative refractive power and located between the first lens group and the photosensitivity element wherein the second lens group comprises at least an aspheric lens and the number of the aspheric lens is smaller than or equal to 2, and wherein the second lens group is suitable for moving a distance D so as to shift the magnification of the zoom lens from a wide-end to a tele-end, while the effective focal length of the zoom lens corresponding to the wide-end is defined as EFL and EFL/D≦0.132;
    a third lens group, having a positive refractive power and located between the second lens group and the photosensitivity element, wherein the third lens group comprises at least a hybrid lens and the second lens group is suitable for moving between the first lens group and the third lens group;
    a fourth lens group, having a positive refractive power and located between the third lens group and the photosensitivity element, wherein the fourth lens group is suitable for moving between the third lens group and the image sensor.

2. The zoom lens as recited in claim 1, wherein the first lens group comprises:
    a first lens, having a negative refractive power;
    a second lens, having a positive refractive power and located between the first lens and the second lens group; and
    a third lens, having a positive refractive power and located between the second lens and the second lens group.

3. The zoom lens as recited in claim 1, wherein the second lens group comprises:
    a fourth lens, having a negative refractive power;
    a first aspheric hybrid lens, having a negative refractive power and located between the fourth lens and the third lens group; and
    a second aspheric hybrid lens, having a positive refractive power and located between the first aspheric hybrid lens and the third lens group.

4. The zoom lens as recited in claim 3, wherein the first aspheric hybrid lens comprises a fifth lens and a first resin layer, wherein the first resin layer is disposed on the surface of the fifth lens and located between the fourth lens and the fifth lens; the second aspheric hybrid lens comprises a sixth lens and a second resin layer, wherein the second resin layer is disposed on the surface of the sixth lens and located between the sixth lens and the third lens group.

5. The zoom lens as recited in claim 1, wherein the second lens group comprises:
    a fourth lens, having a negative refractive power;
    a fifth lens, having a negative refractive power and located between the fourth lens and the third lens group; and
    a sixth lens, having a positive refractive power and located between the fifth lens and the third lens group.

6. The zoom lens as recited in claim 5, wherein the fifth lens is a spherical lens, while the sixth lens is an aspheric lens.

7. The zoom tens as recited in claim 1, wherein the third lens group comprises:
    a third aspheric hybrid lens, having a positive refractive power;
    an eighth lens, having a positive refractive power and located between the third aspheric hybrid lens and the fourth lens group; and
    a ninth lens, having a negative refractive power and located between the eight lens and the fourth lens group.

8. The zoom lens as recited in claim 7, wherein third aspheric hybrid lens comprises:
    a seventh lens; and
    a third resin layer, disposed on the surface of the seventh lens and located between the seventh lens and the eighth lens.

9. The zoom lens as recited in claim 1, wherein the fourth lens group comprises:
    a tenth lens, having a negative refractive power; and
    an eleventh lens, having a positive refractive power and located between the tenth lens and the photosensitivity element.

* * * * *